Aug. 23, 1966  A. F. YEPIS  3,267,836
AUTOMATIC TACO SHELL COOKER
Filed April 27, 1964  2 Sheets-Sheet 1

INVENTOR.
ALFONSO F. YEPIS
BY
ATTORNEYS

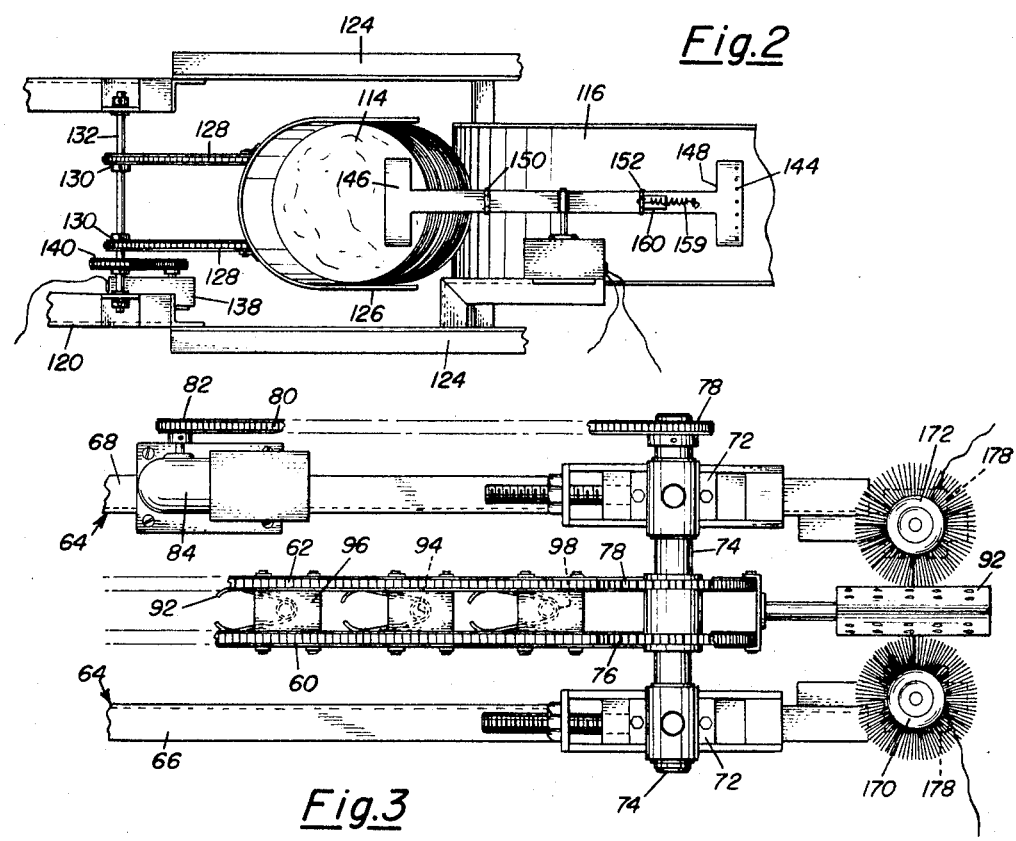
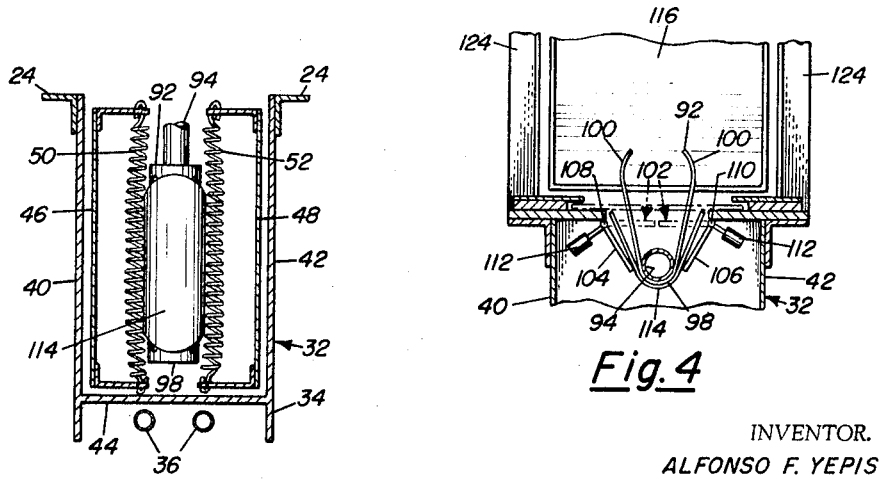
INVENTOR.
ALFONSO F. YEPIS

United States Patent Office 3,267,836
Patented August 23, 1966

3,267,836
AUTOMATIC TACO SHELL COOKER
Alfonso F. Yepis, 231 Garrett, Chula Vista, Calif.
Filed Apr. 27, 1964, Ser. No. 362,827
16 Claims. (Cl. 99—404)

The present invention relates to a cooker, particularly of the type which is completely automatic in operation, and more particularly to one for cooking tortillas to form taco shells.

Cookers of this type employ a tank or vessel for cooking oil, a heater being applied for heating the oil up to cooking temperature. The tortillas are placed in the vessel and after a cooking time, they are removed, and when removed are identified as a taco shell.

In practicing the present invention, molds are progressively moved through the heated cooking oil in the vessel. Yieldable elements are disposed within the vessel. These elements are spaced from one another, and together form part of taco shell forming apparatus. In the embodiment illustrated, these elements are in the form of two series of coil springs which are arranged, preferably, at right angles to the direction of movement of the U-shaped molds. In the present embodiment, the molds move horizontally through the space between the two series of yieldable elements, i.e., between the two series of coil springs, and the coil springs are disposed so that the axes thereof are at right angles to the direction of movement of the molds, and the leading ends of the molds extend vertically and the sides thereof spread rearwardly.

The extreme rear distance between the sides of the molds is slightly more than the distance between the two series of springs, whereby the extreme portions of the tortilla are brought positively into contact with the confronting springs of the two series of springs as the tortillas are being pushed through the oil. Such contact maintains the tortillas in position on the molds.

Feeding mechanism is provided for feeding the tortillas, one at a time, to a position above the level of the oil at which position a mold engages the tortilla and moves it into and through the oil. This feeding mechanism is synchronized with the speed of movement of the molds so that one, and only one, tortilla is fed to that position at the time it is to be engaged by a mold.

A carriage is provided for stacked tortillas. It is raised automatically at such speed that the uppermost tortilla is at a predetermined height each time that one should be removed by a mechanism for that purpose. When removed, it falls within a chute and is conducted to the position at which it is removed by a mold.

Preferably, gate means is provided and forms the platform for the tortilla at the position where it is removed by the mold. This gate means is in the form of two hinged gates which are yieldingly biased toward a horizontal position with the free ends of the gates extending toward one another.

When a tortilla is delivered onto the gates, the mold engages the gates, pushing the tortilla downwardly, the gates yieldingly opening for permitting the molds and the tortilla to pass downwardly beyond the gate. After passing beyond the gates, the gates are again moved to gate closing position for receiving the next tortilla.

Mechanism is provided for removing the taco shells from the molds after they are lifted out of the oil.

Other features and the advantages of the present invention will be apparent from the following description, reference being had to the accompanying drawings wherein a preferred embodiment of the invention is illustrated.

In the drawings:

FIG. 2 is a fragmentary plan view of part of the tortilla feeding mechanism, the view being taken looking in the direction of arrows 2—2 of FIG. 1 but on a larger scale;

Figure 1:
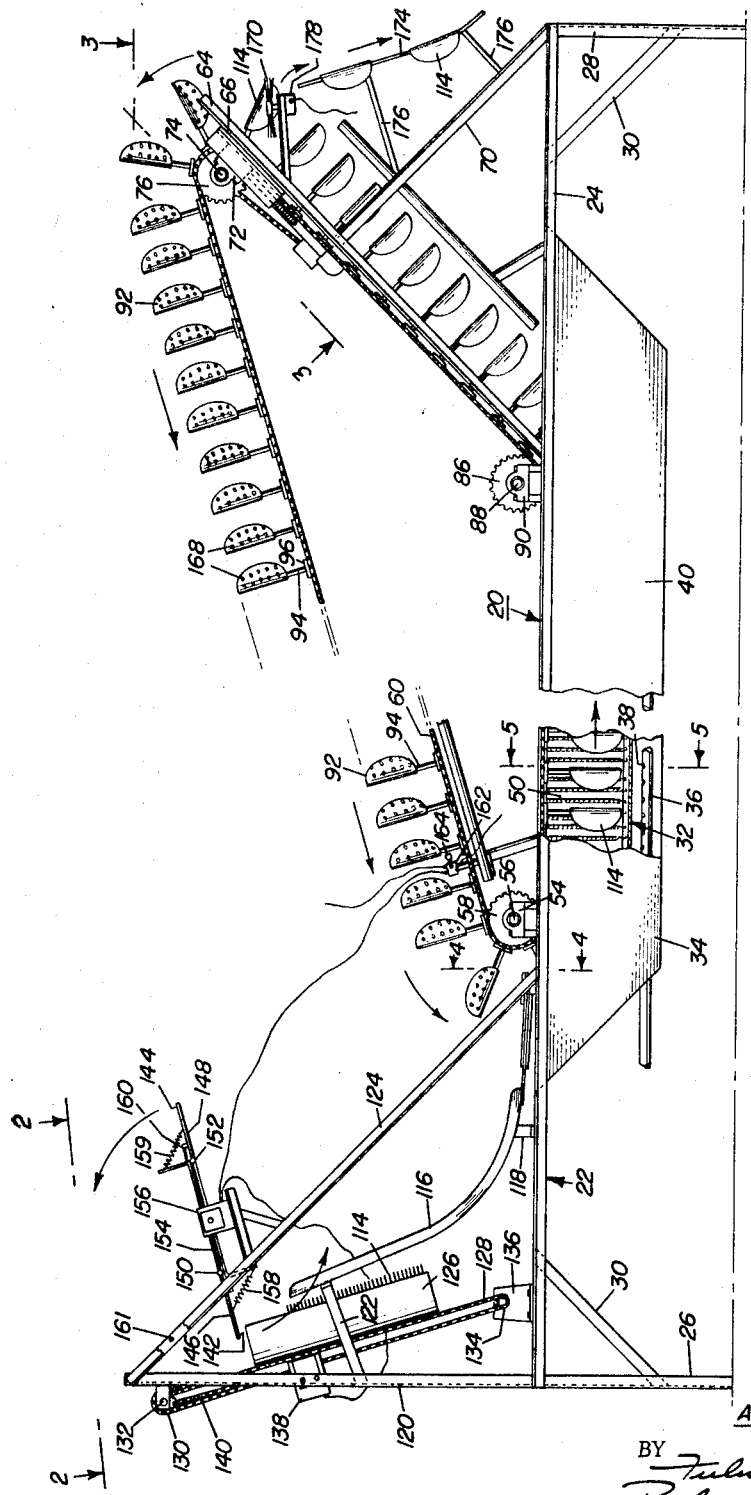
FIG. 1 is a right side view of the assembled cooker, part of the cooking vessel being shown in section to show the disposition of the molds as they pass through the cooker, and also showing the disposition of the yieldable elements (coil springs) with respect to the molds.

FIG. 3 is a fragmentary plan view of the rear of the cooker, looking in the direction of arrows 3—3 of FIG. 1, but on a larger scale; and FIGS. 4 and 5 are fragmentary section views taken along lines 4—4 and 5—5, respectively, of FIG. 1, but on a larger scale.

Referring more in detail to the drawings, the cooker assembly is shown at 20. It includes an elongated main frame 22, including horizontally spaced rails, the left one being shown at 24. These rails are parallelly arranged and are supported by front and rear legs, one of the front legs being shown at 26, and one of the rear legs at 28. Suitable braces 30 connect the rails 24 and legs 26.

A tank or vessel 32 for cooking oil, is suspended from the rails 24. The sides of the tank are provided with a skirt section 34 which extends below the floor of the tank. A heater 36 is employed for heating the oil, and is herein shown as pipes for gas, having a series of gas outlets 38. This tank is elongated horizontally. The left side wall of the tank is shown at 40, the right side wall at 42 and the bottom at 44.

Two upright frames 46 and 48 are suitably attached to the interior of the tank, and each of these upright frames carries a series of yieldable elements, herein for illustrative purposes, comprising a series of coil springs. One series of coil springs 50 is carried by the frame 46, and the other series of coil springs 52 is carried by the frame 48. The axes of these springs, preferably, extend substantially vertically.

Each of the rails 24 carries a bearing block 54, the axes of which extends transversely of the rails for carrying a rotatable shaft 56. Two sprockets are fixed to the shaft, one of which is shown at 58. Each of these sprockets is for chains 60 and 62, forming part of a conveyor system. The shaft 56 is disposed adjacent the front end of the tank 32. A sub-frame 64 is carried adjacent the rear of the tank and it includees two upwardly and rearwardly extending rails 66 and 68, which are suitably secured to the rails 24 and are braced by braces 70. The upper end of the rails 66 and 68, each carries a bearing block 72 for a shaft 74. The shaft is arranged parallelly of the shaft 56. A pair of sprockets 76 are attached to the shaft 74, and the chains 60 and 62 mesh with the teeth of the sprocket. A third sprocket 78 is carried by the shaft 74, which sprocket receives an endless chain 80. The chain 80 is driven by a sprocket 82 which in turn is driven by a motor 84. When the motor is in operation, it rotates the shaft 74 in a counter-clockwise direction, causing the chains of the conveyor system to rotate in a counterclockwise direction.

Idler sprockets 86 are carried by a shaft 88. This shaft is rotatably mounted in bearing blocks 90 which are carried by the rails 24. The chains 60 and 62 are strung under the sprockets 86. The shafts 56 and 88 are so disposed with respect to the tank 32, so that the chains move horizontally directly over the oil in the tank.

A plurality of individual molds 92 are fixed to the chains through stems 94 and plates 96. The plates are directly secured to the pair of chains. The molds are somewhat U-shaped, having a leading section 98 and outwardly diverging side wall 100. When the cooker assembly is in operation, the molds 92 depend from the chain section as they pass to the right and in the heated oil in the tank, as viewed in FIG. 1.

The tortillas are delivered to a platform at the front end of the tank 32, which platform lies in the path of movement of the molds. The leading edge 98 of the mold 92 at that time is substantially in a horizontal plane. The platform is in the form of a gate means which is shown in dotted lines at 102 in FIG. 4. This gate means comprises two gates 104 and 106, which are hinged at 108 and 110, respectively. The axes about which the gates turn are parallel and extend transversely of the shaft 56. Any suitable means may be employed for yieldingly urging the gates to their closed position, and the means herein shown comprise weights 112 which are fixed to the gatese and depend substantially vertically when the gates are in the closed position. A tortilla 114 is shown in FIG. 4, being pushed by the mold 92 through the gates 104 and 106.

The tortillas are delivered to the platform or gate means 102 by a chute 116, which extends downwardly and forwardly, as viewed in FIG. 1. The lower end of the chute is attached to the rails 24 by brackets 118, and the upper end of the chute is attached to uprights 120 by frame members 122. The upper ends of the uprights 120 are connected to braces 124, and the lower end of these braces are connected to the rails 24.

A carriage for stacked tortillas is shown in FIG. 1 at 126. This carriage is suitably attached to an endless chain 128 which is suitably driven by a sprocket 130. This sprocket is carried at the upper portion of the uprights 120 on a shaft 132. The chain 128 is also strung about a sprocket 134, which is suitably supported on brackets 136 which are carried by the rails 24. Shaft 132 is driven by a motor 138 through endless chain 140, and suitable sprockets (not shown). The speed of the motor 138 is such that the uppermost tortilla thereon is at a predetermined height at the time that a tortilla should be fed to the chute 116.

The mechanism for removing the uppermost tortilla from the carriage, comprises a series of pins or barbs 142 and a series of pins or barbs 144. These pins are carried, respectively, by levers 146 and 148. These levers are hinged, respectively, at 150 and 152 upon a rotatable arm 154, which is driven by an electric motor 156. Normally the levers 146 and 148 are in the position shown in FIG. 1, and are restrained from moving from that position by springs 158 and 159. Studs 160 limit the extent of counter-clockwise movements of the lever relative to the arm 154. As the arms 154 are rotated in a counter-clockwise direction, and as viewed in FIG. 1, the ends of levers 146 and 148 will alternately engage a rod 161, carried between the braces 124. When the lever 146 engages the rod 161, the movement of the lever will be impeded until the end thereof slides by the rod. During this impeding, the tension of the spring 158 will be increased, and when the end of the lever passes by the rod 161, snap action will be imparted to the lever, whereby assuring entry of the pins 142 of the uppermost tortillas and assuring removal of the uppermost tortillas to the right. Subsequently, the arms 154 will be moved, whereby the pins 144 will be brought into play to function in the same manner as expressed with respect to pins 142. The movement of the motor 156 is synchronized with the movement of the speed of movement of the molds 92. For this purpose there is provided an electric switch 162 which is snap-actuated by an arm each time one of the stems, carrying the mold 92, engages the same. In this manner the motor 156 is operated intermittently. Preferably, the motor 138, for raising the carriage 126, is also actuated intermittently in synchronism with the speed of movement of the molds 92. In this manner tortillas are delivered, one at a time, to the gate means 102 just prior to being engaged by one of the molds 92.

The mold, at the time of engagement with a tortilla on the platform or gate means 102, has its leading edge in a substantially horizontal position. It forces the tortilla downwardly through the gates 104 and 106, as shown in FIG. 4. Further progressive movement of the leading edge of the mold will cause the tortilla to be submerged in the heated cooking oil and then moved substantially horizontally through the vessel 32, there being some sagging of the chains and molds carried thereby as they pass from sprocket 58 to sprocket 86.

Again referring to FIG. 4, it will be seen that the sides 100 flare outwardly, rearwardly, and the greatest horizontal width, viewed from a vertical position, is slightly more than the distance between the series of springs 50 and the series of springs 52, whereby when a mold is pushing a tortilla, the end portions of the tortilla are in frictional engagement with both series of springs 50 and 52, and in this manner the tortillas are held in position in front of the molds as the mold passes through the oil in the vessel. It will be observed that the mold is provided with a plurality of perforations 168 for the circulation of the heated cooking oil therethrough.

After leaving the vessel 32, as is more clearly shown in FIG. 1, the finished taco shells are lifted upwardly and rearwardly, where they are encountered by two brushes 170 and 172. As viewed in FIG. 3, brush 170 moves in a clockwise direction and brush 172 moves in a counter-clockwise direction for moving the taco shells off the molds, that is, to the right, as viewed in FIGS. 1 and 3. Upon being removed from the molds, they are directed onto a downwardly angling bar 174 and slide downwardly thereon. This bar is supported by brackets 176, which are attached to the braces 70. The brushes are actuated by electric motors 178.

Thus it will be seen from the foregoing, that by virtue of the present invention, after the machine is started and the oil heated to a predetermined degree, it is necessary only to maintain a quantity of tortillas in the carriage 126, and thereafter all operation is automatic except for removing stacks of taco shells from the right side of the machine. It will, of course, be understood that the usual thermostatic control can be employed for maintaining the cooking oil at the desired temperature.

While the form of embodiment herein shown and described, constitutes preferred form, it is to be understood that other forms may be adopted falling within the scope of the claims that follow.

I claim:
1. A cooker for converting tortillas into taco shells, comprising in combination:
   (A) A cooking vessel adapted to contain cooking oil;
   (B) confronting yieldable elements fixedly mounted within the vessel disposed in spaced relationship;
   (C) a plurality of tortilla engaging molds having side plates;
   (D) a conveyor for moving the molds through the space between said confronting yieldable elements whereby tortillas frictionally engage the confronting yieldable elements while being moved by the molds through the vessel, said yieldable element being disposed for yieldingly urging the tortillas against the side plates of the mold.

2. A cooker as defined in claim 1, characterized in that the confronting yieldable elements are in the form of two series of coil springs, one series being in confronting relationship and spaced from the other series.

3. A cooker as defined in claim 1, characterized in that the confronting yieldable elements are in the form of two series of vertically extending coil springs, one series being in confronting relationship and horizontally spaced from the other series.

4. A cooker for converting tortillas into taco shells, comprising in combination:
   (A) A cooking vessel adapted to contain cooking oil;
   (B) confronting yieldable elements within the vessel disposed in spaced relationship;
   (C) a plurality of tortilla engaging molds;
   (D) a conveyor for moving the molds through the space between said confronting yieldable elements whereby tortillas frictionally engage the confronting yielding elements by being moved by the molds through the vessel, said conveyor including:
   (1) a section for elevating the molds above the cooking oil in the vessel;
(E) means for feeding tortillas to a position in the path of movement of the molds while the molds are elevated above the cooking oil, and prior to the movement of said molds into the cooking oil;
(F) and means for synchronizing the movement of the feeding means with the speed of movement of the conveyor.

5. A cooker as defined in claim 4, characterized to include:
(G) and means for removing the taco shells off of the molds after the molds are elevated above the oil in the vessel.

6. A cooker as defined in claim 5, characterized in that said means (G) for removing the taco shells off of the molds after the molds are elevated above the oil in the vessel, includes a rotating brush.

7. A cooker as defined in claim 4, characterized to include:
(G) a carriage for delivering tortillas to the means (E) for feeding tortillas to a position in the path of movement of the molds.

8. A cooker as defined in claim 7, characterized to include:
(G) means synchronized with the speed of movement of the conveyor for controlling the movement of the carriage.

9. A cooker as defined in claim 4, characterized in that said means (E) for feeding tortillas to a position in the path of movement of the molds includes:
(E)(1) means for engaging the tortilla; and
   (2) means for yieldingly restraining movement of (E)(1) means prior to engagement of the latter with the tortillas.

10. A cooker as defined in claim 4, characterized in that said means (E) for feeding tortillas to a position in the path of movement of the molds includes:
(E)(1) a pin for engaging the tortilla;
   (2) a lever carrying said pin
   (3) an arm for moving the lever;
   (4) a spring connecting the arm and lever;
   (5) means lying in the path of movement of the lever for impeding movement of the lever relative to the arm;
   (6) and a motor for moving the arm.

11. A cooker as defined in claim 4, characterized in that said means (E) for feeding tortillas to a position in the path of movement of the molds includes:
(E)(1) a carriage for elevating taco shells to above the path of movement of the molds;
   (2) means for removing the tac shells off of the carriage;
   (3) and a chute for conveying the removed shells to the path of movement of the molds.

12. A cooker as defined in claim 4, characterized to include:
(G) gate means for receiving the tortillas, said gate means being disposed in the path of movement of the molds;
(H) and means for yieldingly restraining movement of the gate means.

13. A cooker as defined in claim 12, characterized in that the gate means includes two substantially parallelly hinged gates having their free ends extending toward one another.

14. A cooker for converting tortillas into taco shells, comprising in combination:
(A) An elongated cooking vessel adapted to contain cooking oil, said vessel having an entrance end and an exit end;
(B) two series of yieldable elements disposed in confronting relationship with one another, each series extending longitudinally of the elongated vessel and being spaced from one another;
(C) a plurality of molds for tortillas;
(D) a conveyor for moving the molds longitudinally of the vessel and between the series of yieldable elements whereby the tortillas frictionally engage the confronting yieldable elements while being moved by the molds through the vessel, said conveyor including;
   (1) a section for elevating the molds above the cooking oil in the vessel, said section extending longitudinally of the vessel;
(E) means for feeding tortillas to a position at the entrance end of the vessel and in the path of movement of the molds while the molds are elevated above the cooking oil, said means including:
   (1) two hinged gates having the axes thereof lying substantially aligned with the direction of movement of the molds, said gates having their free ends extending toward one another and lying in a substantially horizontal plane, said gates being disposed to receive tortillas;
   (2) means yieldingly restraining movement of the gates from said horizontal plane;
   (3) a carriage for tortillas;
   (4) a motor for elevating the carriage;
   (5) a pin for engaging the tortillas and removing the tortillas, one at a time, from the carriage;
   (6) a lever carrying the pin;
   (7) an arm for moving the lever;
   (8) a spring connecting the arm and lever for restraining movement of the lever relative to the arm;
   (9) means lying in the path of movement of the lever for impeding movement of the lever relative to the arm;
   (10) a motor for moving the arm;
   (11) a chute for receiving the tortillas from the carriage and delivering them to the gates;
(F) means for synchronizing the movement of the last mentioned motor with the speed of movement of the conveyor;
(G) and a brush for removing the tacos from the molds.

15. A cooker as defined in claim 14, characterized in that the synchronizing means controls the movement of the carriage.

16. A cooker as defined in claim 14, characterized in that the series (B) of yieldable elements include: two series of vertically extending coil springs, one series being in confronting relationship and horizontally spaced from the other series.

References Cited by the Examiner

UNITED STATES PATENTS

| | | | |
|---|---|---|---|
| 2,540,687 | 2/1951 | Netterstrom | 15—3.15 |
| 2,546,163 | 3/1951 | McBeth | 99—404 |
| 2,967,474 | 1/1961 | Ford | 99—404 |

WALTER A. SCHEEL, *Primary Examiner.*

ROBERT W. JENKINS, *Assistant Examiner.*